United States Patent [19]

Coles et al.

[11] Patent Number: 4,665,394

[45] Date of Patent: May 12, 1987

[54] COLOR SELECTION APPARATUS

[75] Inventors: Peter R. Coles, Gladesville; Stephen G. Costello, West Pymble, both of Australia

[73] Assignee: Taubmans Industries Limited, Villawood, Australia

[21] Appl. No.: 697,242

[22] Filed: Feb. 1, 1985

[30] Foreign Application Priority Data

Feb. 10, 1984 [AU] Australia ............................ PG3577

[51] Int. Cl.$^4$ ............................................. G09B 19/00
[52] U.S. Cl. .............................. 340/815.1; 340/815.15; 434/98; 434/102
[58] Field of Search ............... 340/701, 703, 815.1, 340/815.12, 815.14; 40/573, 444, 581; 434/98, 102

[56] References Cited

U.S. PATENT DOCUMENTS

| | | | |
|---|---|---|---|
| 2,636,286 | 4/1953 | Bowman | 434/98 |
| 3,175,209 | 3/1965 | Bramer, Jr. | 340/701 |
| 3,384,983 | 5/1968 | Olson | 434/98 |
| 4,232,311 | 11/1980 | Agneta | 340/703 |
| 4,457,718 | 7/1984 | Lerner | 434/98 |

FOREIGN PATENT DOCUMENTS

636955  2/1962  Canada ............................... 434/98

Primary Examiner—Gerald L. Brigance
Attorney, Agent, or Firm—Nies, Webner, Kurz & Bergert

[57] ABSTRACT

The present invention relates to a color selection apparatus for aiding in the selection of colored paints having regard to a preselected color and a particular chromatic relationship. The apparatus, briefly stated, comprises an array of pre-selected colors, means for registering a selected color in the array, means for registering a selected chromatic relationship, and means for determining a color related to the selected color by the selected chromatic relationship.

7 Claims, 18 Drawing Figures

COLOR SELECTION APPARATUS

BACKGROUND OF THE INVENTION

1. Field of the Invention The present invention relates to colour selection and in particular provides an apparatus whereby a customer may select desired paint colours having regard to particular requirements such as contrast or harmony.

The invention will be described hereinafter with reference to a particular type of colour selection apparatus. However, it will be appreciated by those skilled in the art that the invention is not limited to this particular embodiment or field of use.

2. Description of the Prior Art

It is well known to select paint colours from a colour chart displaying a selection of available colours in discrete sample areas spaced over the chart. Where a wide range of possible colours is available it is known to provide a large display rack holding a matrix array of small packs of colour cards. The cards in any one pack are identical and each card in that pack may display one or more colours. The colour or colours displayed in any one pack are different from those in every other pack and the individual colour packs are preferably arranged on the rack in related groupings. For example, all shades of one colour are preferably displayed in a single area such as a block, row or column.

The coloured face of each card is directed towards the customer who may then remove one or more selected cards from the top of their respective packs, thereby leaving the next underlying identical card visible such that the entire display remains functional provided the packs are periodically replenished.

Preferably, each card includes a plurality of closely similar colours to permit a final and accurate selection to be made.

Once a particular colour has been chosen, the customer frequently needs to select additional related colours to achieve a particular aesthetic effect. This additional selection depends upon what particular chromatic relationship is required between the colours. The customer may wish to draw on accepted rules of harmony, contrast, tonal and triadic relationships to produce the desired effect.

While the tonal relationships between different colours and the use of a "colour wheel" is well known, in cases where perhaps six hundred different colours are available, the customer is often faced with a daunting problem in selecting suitable colour pairs.

It is an object of the present invention to provide a colour display apparatus which will greatly facilitate the selection of related colours.

SUMMARY OF THE INVENTION

The present invention consist in a colour selection apparatus including:
an array of pre-selected colours;
means for registering a selected colour in said array, utilizing a pair of position co-ordinates;
means for registering a selected chromatic relationship; and
means for determining one or more colours, related to the selected colour by the selected chromatic relationship.

BRIEF DESCRIPTION OF THE DRAWINGS

A preferred embodiment of the invention will now be described, by way of example only, with reference to the accompanying drawings in which.

DESCRIPTION OF THE PREFERRED EMBODIMENT

Figure 1:
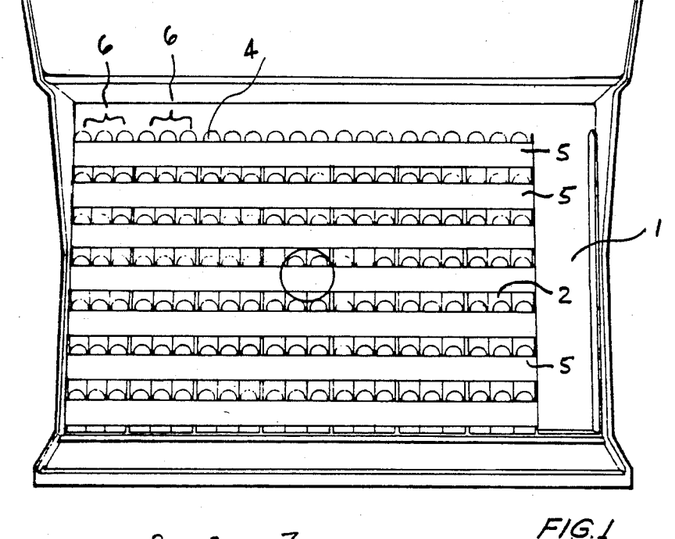
FIG. 1 is a front view of a colour display apparatus according to the invention.
Figure 2:
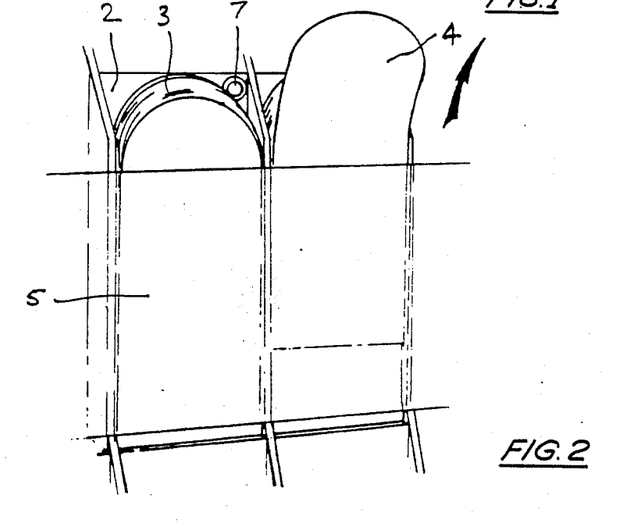
FIG. 2 is an enlarged view of part of the apparatus shown in FIG. 1.

Referring initially to FIG. 1 of the drawings, the display apparatus comprises a vertical rack 1 including a plurality of pockets 2. Each pocket 2 has a transparent front and is adapted to hold a pack 3 of individual colour cards 4. Each card 4 preferably includes a range of several closely related colours and the cards in each pack are different from those in every other pack.

The pockets and their respective packs of colour cards are arranged in a matrix array having seven rows 5 and seven columns 6. For ease of display, the packs are arranged in horizontal groupings of three such that each column includes five rows of three adjacent packs. Depending on the number of colours involved, it may be preferable for each column to include six adjacent packs.

In accordance with the invention, each pocket is identified with a light 7 so that individual packs or related groups of packs can be identified in accordance with customer selection. The operation of this selection process will now be described in more detail.

Figure 3:
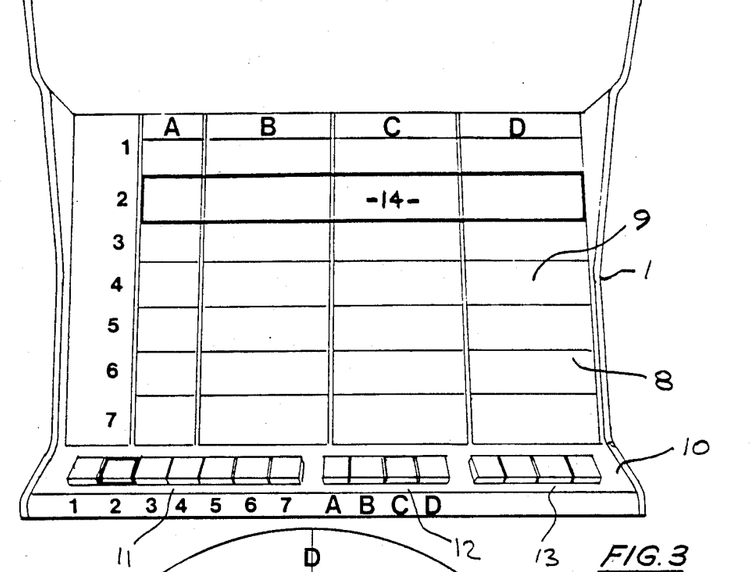
FIG. 3 is a simplified view of the apparatus of FIG. 1 illustrating the selection of a particular group of colours.

FIG. 3 is a simplified view of the display apparatus shown in FIG. 1. The display includes a matrix array 8 comprising seven rows numbered from 1 to 7 and four columns identified with the letters A, B, C and D. For ease of description, it will be assumed that the display apparatus is intended to display only twenty eight colours (7 columns×4 rows) such that the intersection of any pre-selected row and column identifies a colour area 9 representative of a single colour.

Below the matrix array 8 is a switch panel 10 including three groups of switches 11, 12 and 13. The seven switches in the first group 11 are "row selection" switches numbered to correspond with each of the seven matrix rows. The four switches in the second group 12 are "column selection" switches, each labelled to correspond with the four columns. The third group of switches are "related colour selection" switches and are labelled to identify required colour relationships, such as "contrast", "harmony", "tone", "triadic" and "monochromatic".

In operation, the customer inspects the matrix array and selects a desired colour. He then depresses one of the seven row selection switches in the first group 11 to identify the particular matrix row in which the selected colour lies. In this example, it is assumed that the customer has selected the colour appearing in colour area 14, lying on the intersection of matrix row 2 and column C. Accordingly, the customer first depresses the row switch 2 corresponding to the second matrix row. Once this switch has been depressed, the lights 7 associated with each individual colour area 9 in the entire second row are illuminated to identify the selected row.

Figure 4:
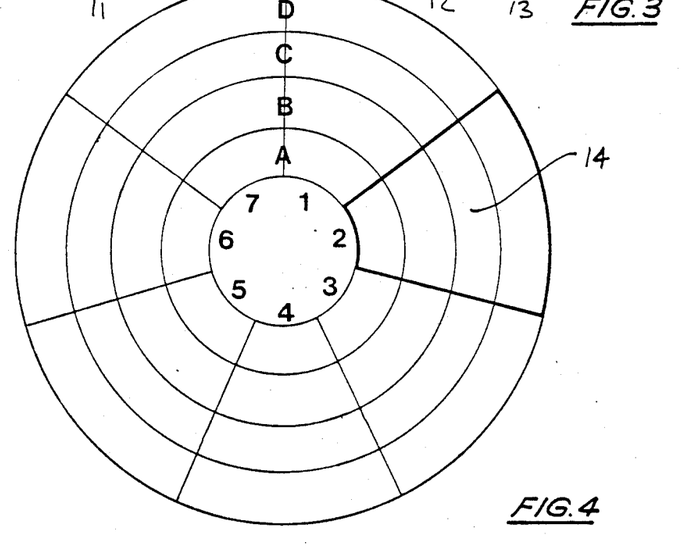
FIG. 4 illustrates a simplified colour wheel and the relationship between the selected group of colours shown in FIG. 3.

The relationship between the colours displayed on the matrix is shown by the colour wheel illustrated in FIG. 4. Each colour area 9 corresponds to a segment on the colour wheel identified by the corresponding angular array of numbers and radially spaced letters. The arrangement of colours in a colour wheel is well known and need not be described further. It can be seen that the selected colours in the illuminated second row of the matrix correspond to the four colours in segment 2 of the colour wheel.

Figure 5:
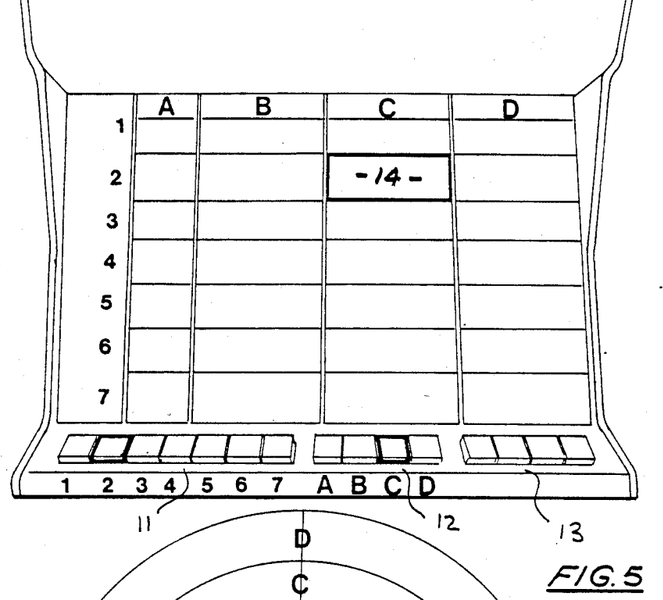
FIG. 5 is similar to FIG. 3 but illustrates a finer colour selection range.
Figure 6:
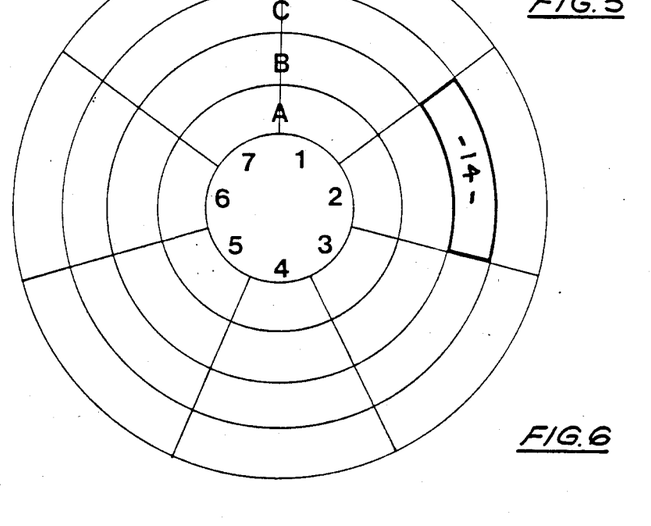
FIG. 6 is similar to FIG. 4 and illustrates the colour or range of colours selected in FIG. 5.

The particular colour selection is completed by the customer next operating the column selection switch corresponding to column C. The selected colour area 14 is then identified as shown in FIG. 5, being the only area now illuminated.

Figures 7, 8:
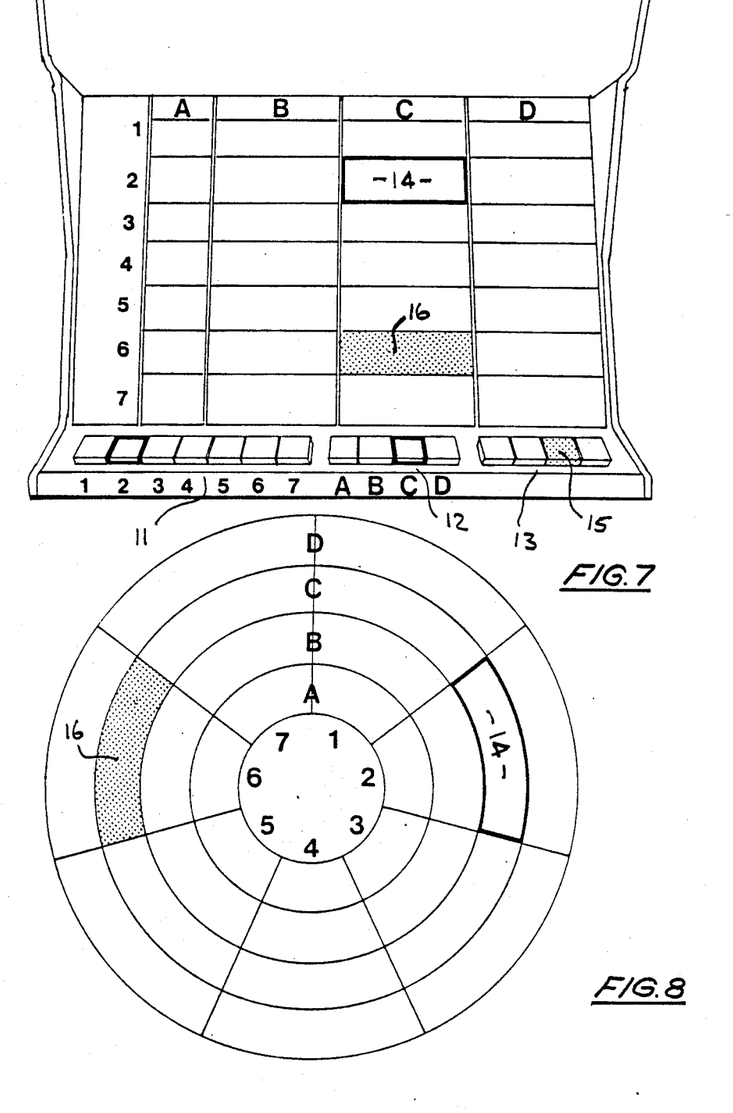
FIG. 7 illustrates the identification of one or more colours or colour ranges selected to contrast with the colour or range of colours illustrated in FIGS. 5 and 6.
FIG. 8 indicates the position on the colour wheel of the contrasting colour or colours identified in FIG. 7.
Figures 9, 10:
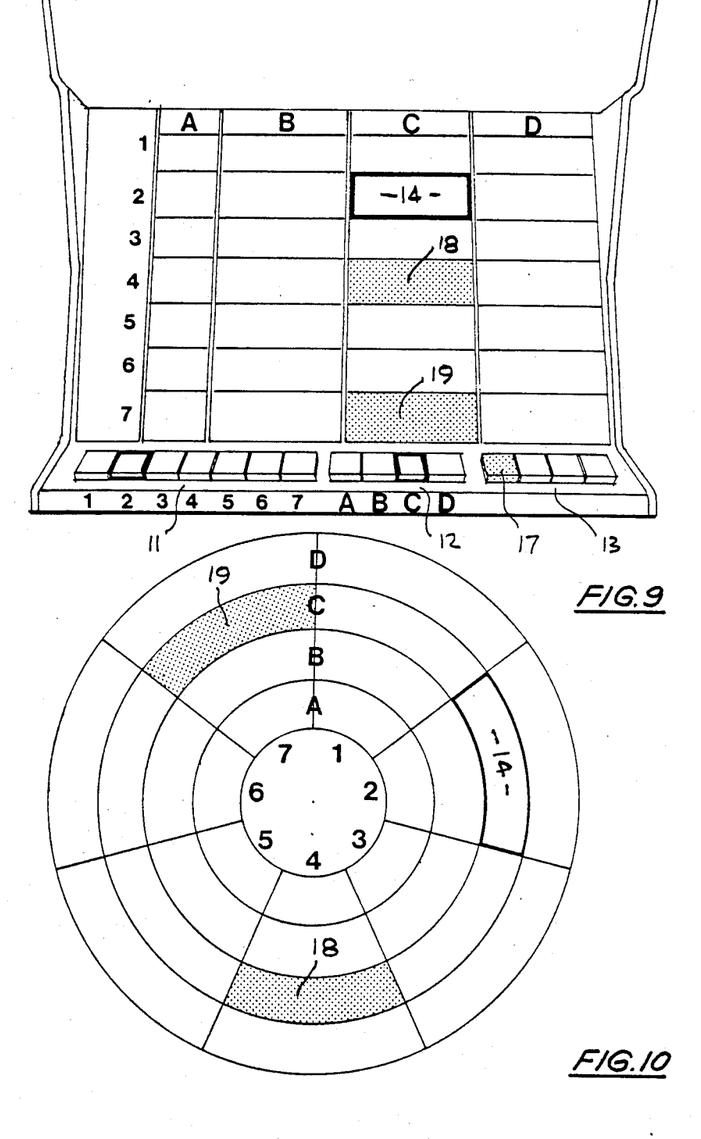
FIG. 9 illustrates the selection of two colours or groups of colours intended to act in harmony with the colour or colours selected in FIG. 5.
FIG. 10 illustrates the position on the colour wheel of the colours selected in FIG. 9.

Having identified the desired colour, the customer can now use the apparatus to select related colours by using the related colour switch group 13. An example of this is shown in FIG. 7 where the customer has depressed the "contrast" switch 15. In accordance with predetermined programming based on the known colour wheel relationship between colours, the display apparatus immediately illuminates the colour area 16 which identifies a contrasting colour. The relationship of the colours in areas 14 and 16 are shown on the colour wheel in FIG. 8.

Figures 11, 12:
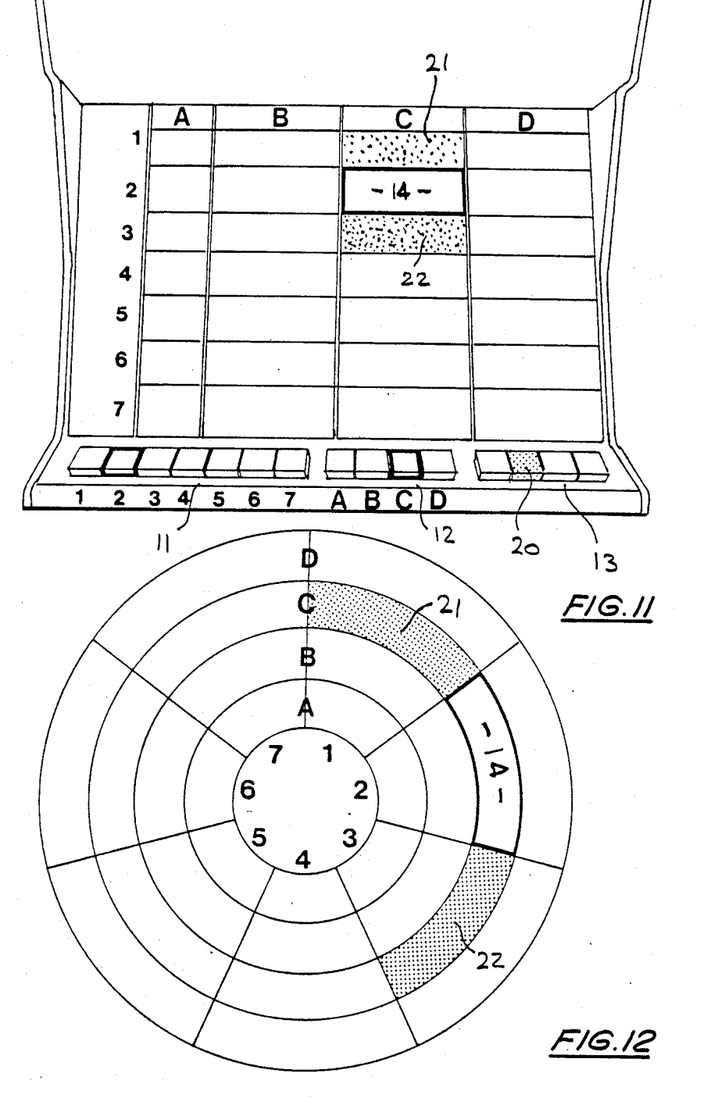
FIG. 11 indicates the selection of two colours or groups of colours on the basis of tone.
FIG. 12 illustrates the position of the selected tone colours on the colour wheel.
Figures 13, 14:
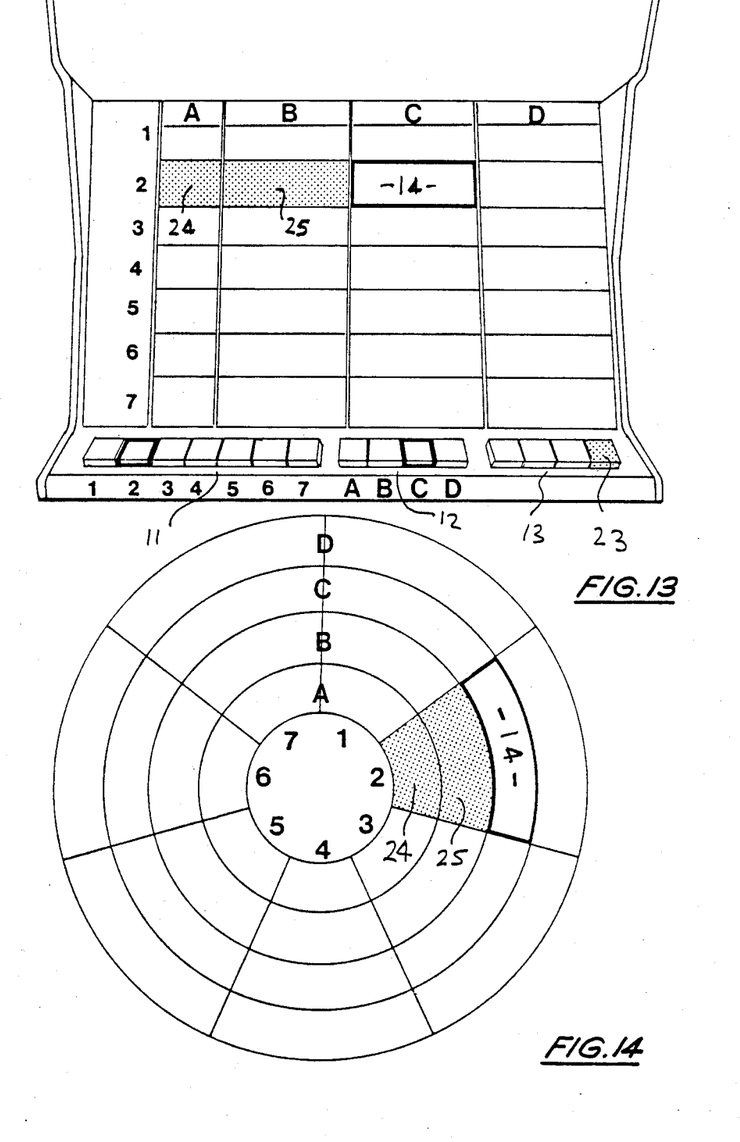
FIG. 13 illustrates the selection of colours related to the FIG. 5 selection on a monochromatic basis.
FIG. 14 illustrates the position of the respective colours on the colour wheel.

Similarly, operation of the "harmony" switch 17 immediately identifies predetermined harmony colours 18 and 19. The "tone" switch 20 will identify colour areas 21 and 22 as shown in FIGS. 11 and 12, while the "monochromatic" switch 23 will identify colour areas 24 and 25 as shown in FIGS. 13 and 14. All these colours are predetermined in accordance with their well known positions on the colour wheel, as shown in the respective illustrations.

For ease of operation, the switches are preferably internally illuminated on operation. The colour area matrix lamps and various selection switches are initially extinguished with the exception of the row selection switches 11 which are flashing in order to indicate the priority of the selection procedure. Once the customer has selected the desired row, all other row switch lamps are extinguished and the column switches 12 then begin to flash until the required column switch is actuated and illuminated. At the completion of this process, the related colour switches 13 begin to flash until the required switch is depressed. The related colour selection is indicated by one or more flashing lamps on the matrix to distinguish this information from the previously selected row-column colour area 14 whose indicator lamp is actively stable. Alternatively, each colour area may be provided with a number of differently coloured lamps to differentiate the initial selection from the one or more related colours subsequently selected.

Any selection can be altered simply by making a further selection, following the sequence. Preferably, after a predetermined time has elapsed from the last switch closure, the system will reset itself to its initial state.

Figure 15:
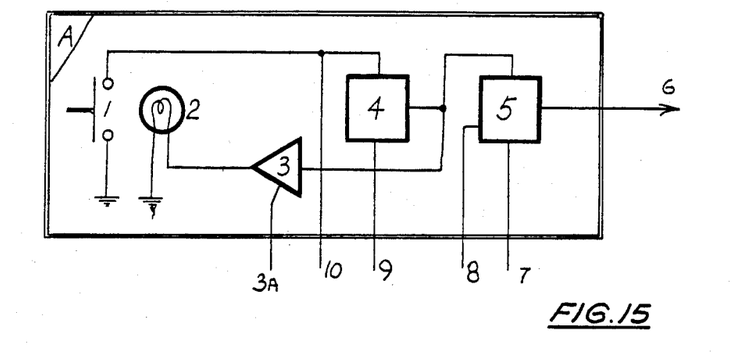
FIG. 15 is a schematic circuit diagram illustrating the operation of a colour row selecting switch.
Figure 16:
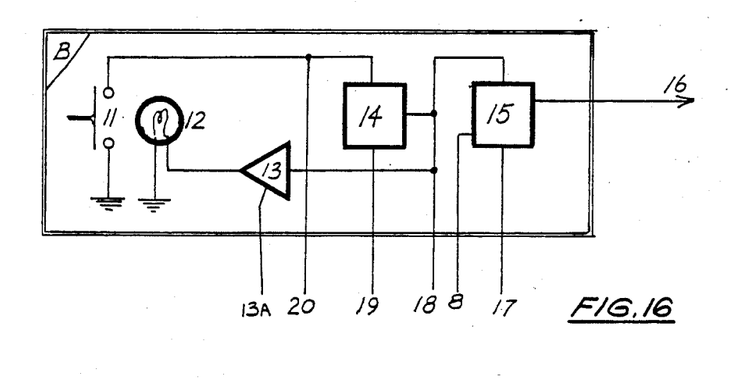
FIG. 16 is a schematic circuit diagram illustrating the operation of a column selecting switch.
Figure 17:
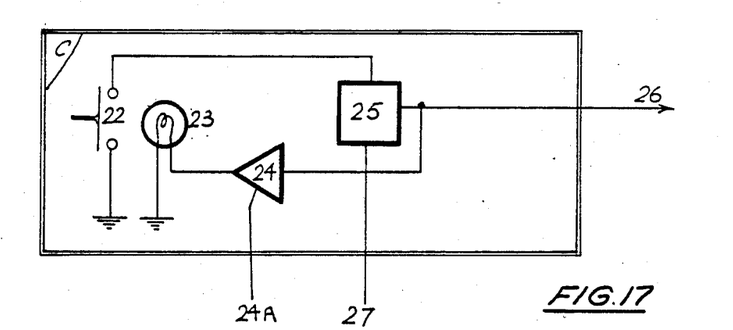
FIG. 17 is a schematic circuit diagram illustrating the operation of a related colour selection switch.
Figure 18:
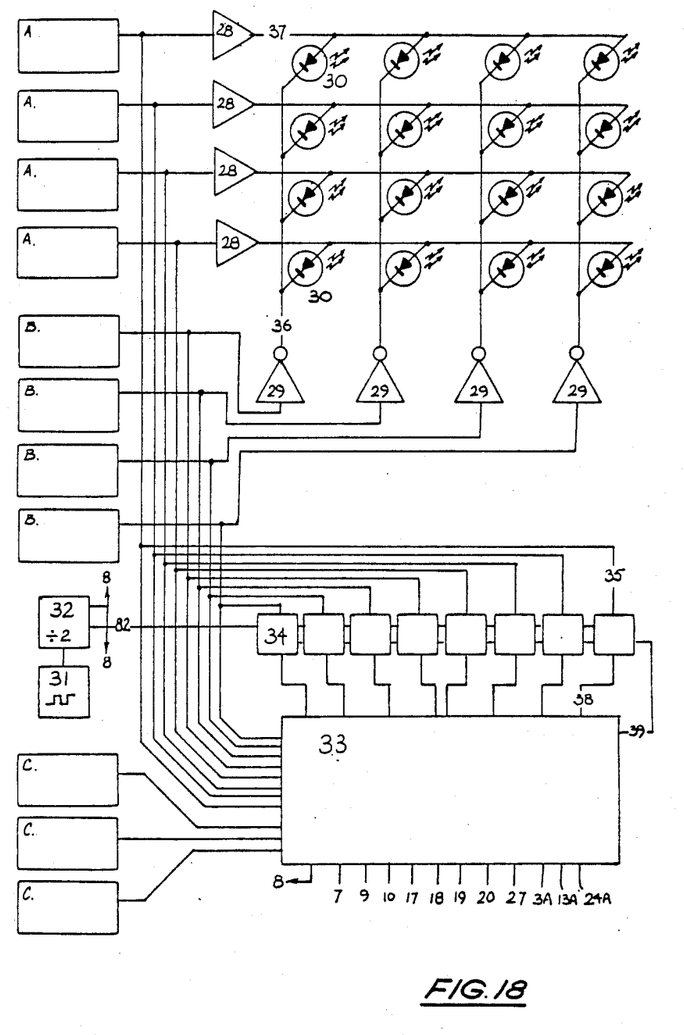
FIG. 18 is a schematic diagram of the complete lamp selection circuitry.

The circuitry for accomplishing the abovementioned colour selection is illustrated schematically in FIGS. 15 through 18. FIGS. 15, 16 and 17 each represent the circuitry of a row, column and related colour selection switch respectively. FIG. 18 indicates the circuitry of a matrix including four row switches A, four column switches B and three related colour selection switches C. The 4×4 matrix of light emitting diodes 30 denote the sixteen colour areas. Each colour area may repreent a single colour or a range of closely related colours. Components in the circuit diagram are identified by reference numerals as follows:

| Reference | Component |
| --- | --- |
| 1,11,22 | push button momentary switches |
| 2,12,23 | switch lamps |
| 3,13,24 | lamp drivers |
| 4,5,14,15,25 | latches - these store switch information as instructed |
| 7,9,17,19,27 | latch reset lines (open switch) |
| 6,16,26 | switch outputs (connect to a buss - common connection shared by other devices) |
| 10,18,20 | latch set lines (close switch) |
| 3A,13A,24A | lamp driver select lines |
| 8 | latch output enable line |
| 28 | lamp driver (row lamps, active high) |
| 29 | lamp driver (column lamps active low) |
| 30 | light emitting diode (lamp-matrix) |
| 31 | alternating signal source |
| 32 | binary divider - provides 01 and 02 signals - purpose = display multiplex |
| 33 | memory and logic unit - provides storage of comparative information and control signals |
| 34 | data latches |
| 38 | data latches set line |
| 39 | data latches reset line |
| 36,37 | column and row drive lines respectively |

Initially, all latches are in the reset state and so there is no output or illuminated lamps except the row switch lamps 2 which are flashed on and off by an alternating signal from logic unit 33 on driver select line 3A.

When the customer closes a row switch 1 this initially sets latches 4 and 5, thereby giving an output 6 on the relevant switch and relevant switch lamp only. The logic unit 33 senses the output 6 and then:

(i) releases select line 3A,
(ii) institutes an alternating signal on select line 13A, thereby flashing the column switch lamps,
(iii) sets latch 15 on all columns thereby enabling current flow in all matrix lamps connected to a driven row,
(iv) resets latches 14, 25 and 34, thereby ridding any old data.

Subsequent closure of a column switch 11 then sets latch 14 and the logic unit senses output on 18 and:
(i) resets all column latches 15 enabling only the correct and selected column output 16 to be relatched. As a result, only the single matrix lamp common to the selected row and selected column remains active,
(ii) releases drive select line 13A, enabling only the selected column switch lamp,
(iii) institutes alternating signal on select line 24A thereby flashing the related colour selection switch lamps,
(iv) resets latches 25 and 34, thereby ridding any old data.

Closure of a related colour selection switch sets the latch 25 relevant to the particular selection and the logic unit then senses an output on line 26 and:
(i) interprets all switch outputs 6,16,26 as an address to memory or data storage during 01 output of divider 32. This is a time when selected driver outputs are enabled and therefore address is valid.
(ii) Outputs data to related colour latches 34 during 02 pulse of divider 32, thereby multiplexing related colour information onto matrix display,
(iii) releases driver select line 24A thereby operating only the selected related colour switch lamps determined by the logic for that particular colour selection.

After a predetermined time from the last switch closure, logic unit 33 resets all latches and institutes an alternating signal on driver select line 3A thereby reverting the apparatus to its initial state. The logic unit 33 may, for example, be a microprocessor.

Although the invention has been described with reference to a specific example, it will be appreciate by those skilled in the art that the invention may be embodied in many other forms.

We claim:

1. A colour selection apparatus including an array of pre-selected colours and means associated with said array of colours comprising: first means for enabling registering and providing corresponding indication of a selected colour from said array, comprising a pair of position co-ordinate means including two sets of switches, each of said sets corresponding to one of said pair of position co-ordinate means, and a first visual indication means for indicating said selected colour, the state of said switches being used to register said selected colour; second means for enabling registering of a selected chromatic relationship comprising a further set of switches, each of said further switches adapted to register by their respective states a selected chromatic relationship; and third means coordinating said registration by said second means with the registration by said first means to select a pre-determined one or more colours, related to said selected colour by said selected chromatic relationship, and including second visual indication means for indicating said one or more colours.

2. A colour selection apparatus according to claim 1, wherein said visual indication means comprise lights, corresponding to the colours in the array of pre-selected colours.

3. A colour selection apparatus according to claim 1 wherein said array of pre-selected colours is disposed in rows and columns.

4. A colour selection apparatus according to claim 3 wherein one of said pair of position coordinate means corresponds to said rows and the other of said pair of position coordinate means corresponds to said columns.

5. A colour selection apparatus according to claim 1 wherein said array is defined by a plurality of pockets each adapted to hold and display a pack of colour sample cards.

6. A colour selection apparatus according to claim 5 wherein each said pocket holds a pack of colour sample cards.

7. A colour selection apparatus according to claim 5 wherein each of said pockets has a transparent front.

* * * * *